UNITED STATES PATENT OFFICE.

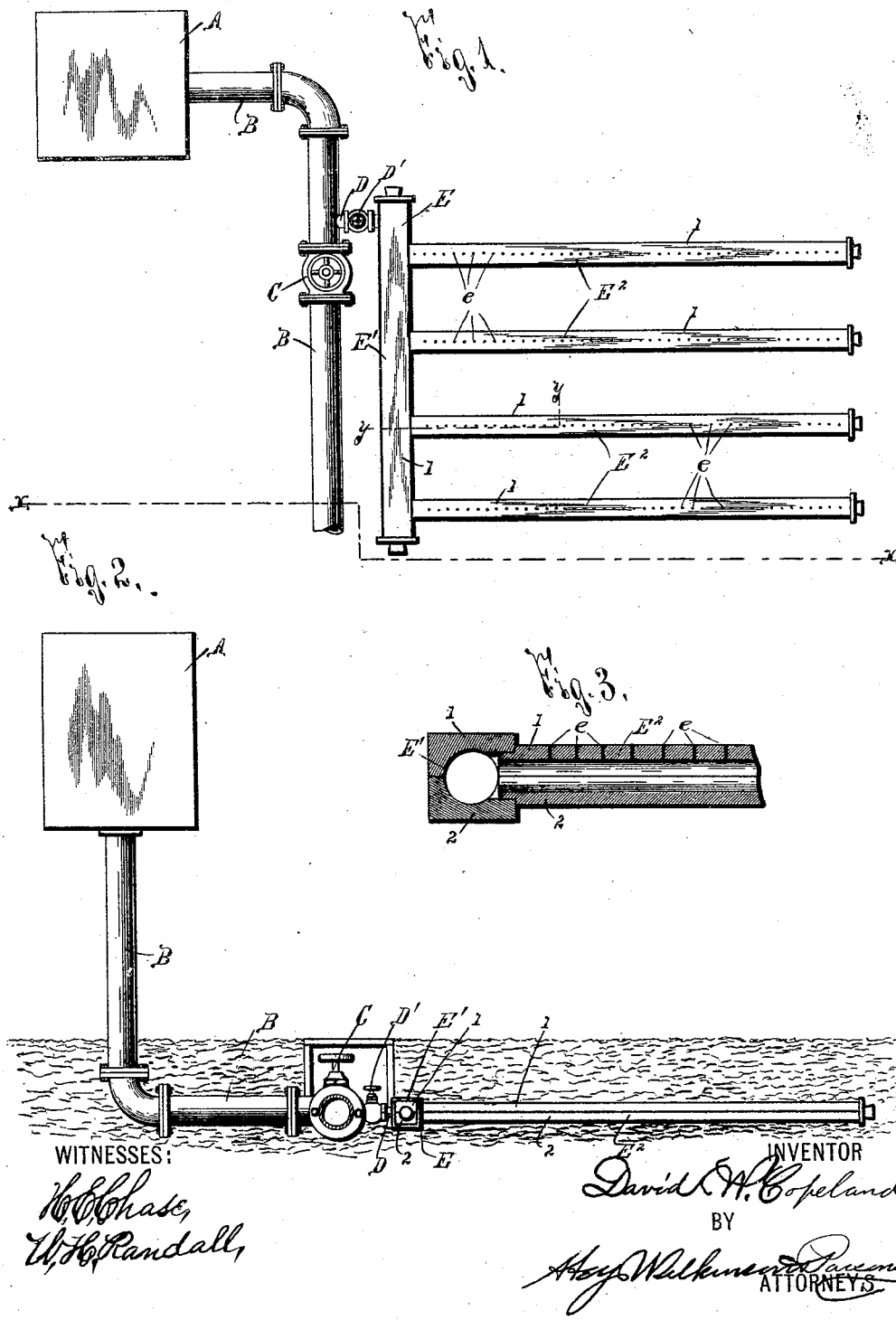

DAVID W. COPELAND, OF SYRACUSE, NEW YORK, ASSIGNOR OF ONE-HALF TO HERMAN D. SELLECK, OF SAME PLACE.

IRRIGATING APPARATUS.

SPECIFICATION forming part of Letters Patent No. 444,564, dated January 13, 1891.

Application filed November 14, 1890. Serial No. 371,384. (No model.)

*To all whom it may concern:*

Be it known that I, DAVID W. COPELAND, of Syracuse, in the county of Onondaga, in the State of New York, have invented new and useful Improvements in an Irrigating Apparatus, of which the following, taken in connection with the accompanying drawings, is a full, clear, and exact description.

My invention relates to an improved irrigating apparatus, and has for its object the production of a simple and effective device for rendering fruitful and moist arid and parched land; and to this end it consists, essentially, in a suitable supply-tank, a trunk or main conducting-pipe having a series of cut-off valves and plugs, a series of irrigating-sections composed of feeding-pipes formed with pores or minute perforations to permit the water to egress or ooze outward slowly and soak into the soil, and valves for regulating the flow of pressure within the irrigating-sections.

In describing this invention reference is had to the accompanying drawings, forming a part of this specification, in which like letters indicate corresponding parts in all the views.

Figure 1 represents a top plan view of a portion of my improved apparatus; and Figs. 2 and 3 are vertical sectional views taken, respectively, on lines $x\ x$ and $y\ y$, Fig. 1.

It is well known that in certain portions of the earth there are large tracts of barren land, the unfruitful condition of which is caused by the absence of moisture. This is especially true of certain tracks of our Western States, and with a view of furnishing moisture there have been constructed throughout certain portions of these formerly barren lands canals or ditches, which conduct the water from adjacent hills or wells to the desired locality. It is evident, however, that with these ditches there is more or less evaporation and waste of the water before the desired point for irrigation is reached. Moreover, it is impractical to thoroughly moisten the entire land by means of ditches, since the part immediately adjacent to the ditches is excessively watered, while the land intervening between them is substantially devoid of moisture.

My improved apparatus is designed to prevent undue waste of the water by conducting the same in a closed pipe or other passage to the desired point to be irrigated and to effect the desired amount of irrigation by supplying the moisture at a point beneath the surface of the earth in order that the same may be drawn upward by capillary attractions to the roots of the plant or vegetable above the same, and thus still further prevent loss by evaporation.

A represents the supply-tank, which may be of any desirable form, size, and construction to attain the desired end. This tank is in proximity to a well or stream, and is filled with water, either constantly or intermittently, by any desirable construction of mechanism—as, for instance, a pump driven by a windmill or other suitable means.

B represents the main or trunk conductor-pipe, which is of desirable length and size to conduct the water from the tank to the particular locality to be irrigated and to furnish the desired amount required for supplying the necessary irrigation.

C represents any desirable construction of valve placed at intervals in the pipe B for shutting off the flow in certain portions of the pipe. Only one of these valves is illustrated; but it will be understood that any desired number is used.

D represents a branch pipe for conducting the water from the trunk-pipe B to the irrigating-sections E. There is a suitable number of these branch pipes and they are provided with valves D' for varying the force and quantity of the water passing to the irrigating-sections E. The irrigating-sections consist, preferably, of the end or head pipe E' and the laterally-extending branch pipes E². These latter pipes and, if desired, the head-pipe E' are laid beneath the ground a suitable distance, so that they are just beneath the extreme point of cultivation for the purpose of preventing their displacement. The ends of the pipes E' and E² are normally closed by plugs, and the water oozes through small perforations $e$ into the ground and is then drawn upward to supply the moisture directly to the roots of the superimposed plants or vegetables without liability of evaporation.

The height of the tank A above the feeding-pipes $E^2$, the length of the supply-pipe B, and the size of the feeding-openings $e$ are so proportioned in relation to each other that when in their normal condition the supply-tank causes a constant oozing or slow feeding of the water from the pipes $E^2$—sufficient to keep the superimposed soil in a constant moist condition. It will be understood, however, that by operating the valves C all the water may be forced into one section, or by operating the valve D' the force and quantity of the water flowing to the irrigating-section may be varied at will. Indeed, in some cases, when the water within the tank A is insufficient, it is desirable to shut off all of the irrigating-sections with the exception of one or two and feed the water from them exclusively and to then shut off these irrigating-sections and supply the water to others.

The pipes $E^2$ are preferably arranged very close to each other in order that the intervening soil may be moistened to the desired degree. For the purpose of economy these pipes are composed of two opposite halves $H^2$, of wood, which may be readily "stuck" through a molding-machine and brought to the desired contour.

Should the pipes become clogged, it will readily be understood that the end plugs may be removed and the full force of the current passed through the pipes until the clogging material is removed.

The feeding-pipes $E^2$ of my improved apparatus may be laid in high places, as knolls, hills, &c., at the same distance beneath the soil as in low places, and owing to the pressure of the water the moisture is thus distributed evenly without reference to the plane of the land, thereby producing an irrigation at present unknown, and particularly impossible by the use of ditches.

I am aware that it is old in an irrigating apparatus to employ a feeding-pipe, as in the patent to Briggs, No. 330,556, in which the water feeds through a lengthwise slit in the pipe formed by a lapped joint at one side thereof; but I am not aware that it is old to feed the water slowly from a series of very minute perforations in the peripheral wall of a pipe placed beneath the ground in order that the water may feed constantly and gradually on opposite sides of the pipe to the superimposed earth, whence it passes directly to the roots of the plant to be watered.

I am also aware that it is not new, as in the patent to Walters, No. 395,726, to provide the feeding-pipe with a drip-opening at its end from which the water gradually drains; but I am not aware that it is old in a feeding-pipe placed beneath the ground and provided with a series of openings from which the water feeds gradually and constantly to form by means of a removable plug a normally-closed opening whereby, when desired, all the material or sediment which enters the perforations when the pipe is not operatively used can be forced or flushed therefrom when the end plug is removed. It will therefore be understood that I do not herein claim such constructions of irrigating apparatus, nor a construction in which the pipe is above the surface of the ground to be irrigated.

The operation of my invention will be readily perceived from the foregoing description and upon reference to the drawings, and it is evident that this improved apparatus may be laid in place at a very slight cost and operated to transform an arid and unfruitful waste to a delightful and fertile condition. Indeed, by the operation of this apparatus the fertility may be increased to such an extent as to exceed some of our most fertile lands, which are at present watered at intervals by nature, since by the continual moisture crops may be forced to the desired degree, as in the ordinary hot-house. It will be understood, however, that my invention is not limited to the detail construction and arrangement of its parts, since the same may be somewhat varied without departing from the spirit thereof.

Having thus fully described my invention, what I claim as new, and desire to secure by Letters Patent, is—

1. In an irrigating apparatus, the combination, with a branch or head pipe, of a series of feeding-pipes extending at intervals therefrom and disconnected at their outer ends, said feeding-pipes having a series of minute perforations for permitting the gradual oozing of the water to the ground, and each of said pipes having its outer end normally closed, but adapted to be opened, as described, whereby any one or more of said pipes may be independently flushed to remove sediment or obstruction, substantially as described.

2. In an irrigating apparatus, the combination of a supply-reservoir, a trunk conveying-pipe, and a series of minutely-perforated feeding-pipes, in combination with a head-pipe from which the feeding-pipes extend and connecting them with the trunk-pipe, the ends of said head-pipe being normally closed by plugs, which are removable, as described, so that said head-pipe may be flushed to remove sediment and prevent its being carried into or through the feeding-pipes, substantially as described.

3. In an irrigating apparatus, the combination of a supply-reservoir, a trunk conveying-pipe, a series of branch or head pipes connected to the trunk conveying-pipe, valves controlling the flow of water in the pipes, and a series of feeding-pipes extending at intervals from the head-pipes and disconnected at their outer ends, the feeding-pipes having a series of minute perforations to permit the gradual oozing of the water to the ground and the ends of said head-pipes and the outer ends of each of said feeding-pipes being normally closed, but adapted to be opened, as described, whereby either of said head-pipes alone or any one or more of said feeding-pipes may be independently flushed to remove sediment or obstruction, substantially as described.

4. An irrigating apparatus consisting of a reservoir, trunk-pipe, connecting-pipes, and valves, combined with branch or head pipes and minutely-perforated feeding-pipes extending at intervals laterally therefrom and disconnected at their outer ends, the ends of said head-pipes and the outer ends of said feeding-pipes being normally closed by removable plugs, whereby any one or more of said pipes may, as desired, be independently flushed to remove any obstruction or sediment therein.

In testimony whereof I have hereunto signed my name, in the presence of two attesting witnesses, at Syracuse, in the county of Onondaga, in the State of New York, this 12th day of November, 1890.

DAVID W. COPELAND.

Witnesses:
 CLARK H. NORTON,
 L. M. BAXTER.